(12) United States Patent
Huybrechts

(10) Patent No.: US 6,174,953 B1
(45) Date of Patent: Jan. 16, 2001

(54) LOW MOLECULAR WEIGHT (METH) ACRYLATE COPOLYMER EMULSIONS

(75) Inventor: Josef Huybrechts, Oud-Turnhout (BE)

(73) Assignee: E. I. du Pont de Nemours and Company, Wilmington, DE (US)

(*) Notice: Under 35 U.S.C. 154(b), the term of this patent shall be extended for 0 days.

(21) Appl. No.: 09/240,082

(22) Filed: Jan. 29, 1999

Related U.S. Application Data

(60) Provisional application No. 60/075,148, filed on Feb. 19, 1998.

(51) Int. Cl.$^7$ ................ C08J 3/00; C08K 3/20; C08L 51/00; C08L 75/00; C08G 63/48
(52) U.S. Cl. ............ 524/504; 524/543; 524/507; 524/591; 524/839; 524/840; 525/66; 525/123; 525/455
(58) Field of Search .................... 524/507, 591, 524/839, 840, 504, 543; 525/123, 455, 66

(56) References Cited

U.S. PATENT DOCUMENTS

| | | | |
|---|---|---|---|
| 5,290,633 | 3/1994 | Devlin et al. | 428/423.1 |
| 5,371,151 | 12/1994 | Berge et al. | 525/377 |
| 5,770,646 | 6/1998 | Antonelli et al. | 524/504 |

FOREIGN PATENT DOCUMENTS

| | | |
|---|---|---|
| 95/19999 | 7/1995 | (WO) . |
| WO 95/19999 | 7/1995 | (WO) . |
| 95/32229 | 11/1995 | (WO) . |
| WO 95/32229 | 11/1995 | (WO) . |

*Primary Examiner*—Patrick D. Niland
(74) *Attorney, Agent, or Firm*—Joseph A. Tessari

(57) ABSTRACT

Graft and block copolymers with a weight average molecular weight below 20,000, a hydroxy value more than 200 and acid value below 50 which copolymers comprise (a) 20–98% by weight of a water soluble macromonomer having a hydroxy value of at least 300, a weight average molecular weight below 6000, containing less than 10% by weight of an acid functional monomer and having a terminal unsaturated double bond; and (b) 2 to 80% of polymerized monomers selected from vinyl monomers, acrylate monomers, methacrylate monomers and mixtures thereof, form stable coating compositions that are compatible with polyisocyanate crosslinking agents and provide improved properties and appearance in automotive finishes.

9 Claims, No Drawings

LOW MOLECULAR WEIGHT (METH) ACRYLATE COPOLYMER EMULSIONS

CROSS-REFERENCE TO RELATED APPLICATIONS

This application is a continuation-in-part of U.S. Provisional Application No. 60/075,148, filed Feb. 19, 1998.

BACKGROUND OF THE INVENTION

This invention relates to an aqueous (meth)acrylate copolymer composition and process for preparation of such composition and the use of such composition in water-borne coatings with improved properties. In particular, this invention is directed to a (meth)acrylate copolymer composition with a hydroxy value above 200, acid value below 50 and weight average molecular weight less than 20,000 comprising a block or graft copolymer prepared directly in water, solvent or water/solvent blend in the presence of a water-soluble macromonomer substantially free of any acid groups so that the final emulsion has a high solids content at low viscosity. This invention also involves coating compositions based on such aqueous copolymer compositions.

Automobiles and trucks receive exterior finishes for several reasons. First, such finishes provide barrier protection against corrosion. Second, consumers prefer an exterior having an attractive aesthetic finish, including high gloss and excellent DOI (distinctness of image). A typical automobile steel panel or substrate has several layers of finishes or coatings. The substrate is typically first coated with an inorganic rust-proofing zinc or iron phosphate layer over which is provided a primer which can be an electrocoated primer or a repair primer. Optionally, a primer surfacer can be applied to provide for better appearance and/or improved adhesion. A pigmented basecoat or colorcoat is next applied over the primer. A typical basecoat or colorcoat comprises a pigment, which may include metallic flakes in the case of a metallic finish. In order to protect and preserve the aesthetic qualities of the finish on the vehicle, it is well known to provide a clear (unpigmented) topcoat over the colored (pigmented) basecoat, so that the basecoat remains unaffected even on prolonged exposure to the environment or weathering. Coating compositions comprise one or more film-forming copolymers and for topcoats acrylic copolymer are preferred. Most commonly, acrylic polymers are linear in structure and cure upon application by reacting with crosslinking agents. The use of non-linear copolymers for coating compositions has also been disclosed, but the use of such polymers, however, have so far found only limited use in the automotive finishes area. See U.S. Pat. No. 5,010,140.

The evolution of environmental regulations has led to the need for products with lower volatile organic content (VOC). However, it is far from trivial to develop aqueous products with desirable properties for automotive finishes. As mentioned above, such finishes must be high performance in terms of aesthetic qualities and durability. Water dispersible polymers are well known in the art and have been used to form waterbased coating compositions, pigment dispersions, adhesives and the like.

The use of cobalt chelates in the preparation of macromonomers for aqueous copolymer dispersions is limited so far to graft copolymers in which either graft or backbone contain ionizable groups in the form of acid or amine. Most of the applications also teach the preparation of such graft copolymers first in a solvent before inverting into a water dispersion.

SUMMARY OF THE INVENTION

We have now found that aqueous graft or block copolymers can be prepared in water, solvent, or a water/solvent blend using a water-soluble macromonomer substantially free of any acid groups to produce coating compositions with a high solids content at a low viscosity. Dispersions and solutions containing such copolymers show excellent compatibility with polyisocyanates in water-borne two-package formulations.

The aqueous graft or block copolymers comprise 20 to 98%, preferably 50 to 85%, of a water-soluble macromonomer with a weight average molecular weight of below 6000, preferably below 2,000, a hydroxyl value of more than 300, preferably more than 400, and containing less than 10% of an acid functional and/or amine functional unsaturated monomer. The remaining 2–80%, preferably 15–50%, of the copolymer comprises a backbone (in the graft copolymer embodiment) or a B block (in the block copolymer embodiment). The graft or block copolymer has a weight average molecular weight of less than 20,000, preferably between 1500 and 8000, a hydroxy value of at least 200, an acid value of less than 50 and preferably no more than 5% of an ionizable monomer.

The water-soluble macromonomer is preferably prepared using a free radical initiator in water or solvent or blend with a Co(II) or Co(III) chelate chain transfer agent.

DETAILED DESCRIPTION

The backbone or the B block, as the case may be, of the graft or block copolymer has a lower OH value relative to the side chains (or the A block) and can contain polymerized ethylenically unsaturated acid or amine monomers or salts thereof. The backbone or B block can contain polymerized monomers which are preferably methacrylates, but which can contain up to 500% of acrylates or vinyl aromatics. Such monomers can comprise alkylmethacrylates and acrylates, cycloaliphatic methacrylates and acrylates and aryl methacrylates and acrylates as listed hereinafter. It can contain up to 50% by weight based on the weight of the copolymer, of polymerized ethylenially unsaturated non-hydrophobic monomers which may contain reactive functional groups. Other vinyl monomers can be incorporated into the backbone or B block, e.g., ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like.

In one embodiment, the graft copolymer emulsion contains 50 to 85% of poly 2-hydroxy ethyl methacrylate macromonomer and 15 to 50% of backbone (or B block) monomers essentially being polymethacrylates. Examples of methacrylate monomers are alkyl methacrylates such as methyl methacrylate, ethyl methacrylate, n-butyl methacrylate 2-ethyl hexyl methacrylate, nonyl methacrylate, lauryl methacrylate, stearyl methacrylate and the like. Examples of other methacrylates can be used such as trimethyl cyclohexyl methacrylate, isobornyl methacrylate, benzyl methacrylate and the like.

Ethylenically unsaturated monomers containing hydroxy functionality include hydroxy alkyl acrylates and hydroxy alkyl methacrylates, wherein the alkyl has 1 to 12 carbon atoms. Suitable monomers include 2-hydroxy ethyl acrylate, 2-hydroxy propyl acrylate, 4-hydroxy butyl acrylate, 2-hydroxy ethyl methacrylate, 2-hydroxy propyl methacrylate, 4-hydroxy butyl methacrylate, and the like, and mixtures thereof. Reactive functionality can also be obtained from monomer precursors, for example, the epoxy group of a glycidyl methacrylate unit in a polymer. Such an epoxy group can be converted, in a post condensation reaction with water or a small amount of acid, to a hydroxy group, or with ammonia and/or a primary amine to give a hydroxy amine. Suitable other olefinically unsaturated comonomers include: acrylamide and methacrylamide and derivatives as alkoxy methyl (meth)acrylamide monomers, such as N-isobutoxymethyl methacrylamide and N-methylol methacrylamide; maleic, itaconic and maleic anhydride and its half and diesters; vinyl aromatics such as styrene and vinyltoluene; polyethylene glycol monoacrylates and monomethacrylates; aminofunctional (meth)acrylates as, e.g., diethylaminoethylmethacrylate and t-butylaminoethylmethacrylate; glycidyl functional (meth) acrylates as glycidylmethacrylate. Other functional monomers as acrylonitrile, acrolein, allyl methacrylate, aceto acetoxyethyl methacrylate, methylacryl amidoglycolate methylether, ethylene ureaethyl methacrylate, 2-acrylamide-2methyl propanesulfonic acid, trialkoxy silyl propyl methacrylate, reaction products of mono epoxyesters or monoepoxy ethers with alpha-beta unsaturated acids and reaction products of glycidyl (meth)acrylate with mono functional acids up to 22 carbon atoms can be used. The above monomers also can be used in the backbone or B block of the copolymer. They also can be used in the macromonomer provided the macromonomer is soluble in water and does contain less than 10% of an acid functional monomer.

To ensure that the resulting macromonomer only has one terminal ethylenically unsaturated group which will polymerize with the remaining monomers to form the graft or block copolymer, the macromonomer is polymerized by using a catalytic chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps, additional monomers and cobalt catalyst and conventional polymerization catalyst are added and polymerization is continued until a macromonomer is formed of the desired molecular weight. Preferred cobalt chain transfer agents or catalysts are described in U.S. Pat. No. 4,680,352, U.S. Pat. No. 4,722, 984 and WO 87/03605. Most preferred are pentacyanocobaltate (II or III), diaquabis(borondifluorodimethyl glyoximato) cobaltate (II or III) and diaquabis (borondifluorophenyl glyoximato) cobaltate (II or III). Typically these chain transfer agents are used at concentrations of about 2 to 5000 ppm based on the monomers used.

The macromonomer is preferably formed in a solvent or solvent blend using a free radical initiator and a Co (II or III) chelate chain transfer agent, although it can be formed in aqueous solution or emulsion when using, for example, diaquabis (borondifluorodimethyl-glyoximato) cobaltate (II or III). Azo initiators (0.5 to 5% weight on monomer) can be used in the synthesis of the macromonomers in the presence of 2 to 5000 ppm (on total monomer) of Co (II) chelate in the temperature range between 70 to 140° C., more preferably azo type initiators as, e.g., 2,2'-azobis (2,4-dimethylpentanenitrile), 2,2'-azobis(2-methylpropanenitrile), 2,2'-azobis (2-methylbutanenitrile), 1,1'-azo(cyclohexane carbonitrile) and 4,4'-azobis (4-cyanopentanoic) acid. Typical solvents that can be used to form the macromonomer copolymer are aromatics, aliphatics, ketones such as methyl ethyl ketone, isobutyl ketone, ethyl amyl ketone, acetone, alcohols such as methanol, ethanol, n-butyanol, isopropanol, esters such as ethyl acetate, glycols such as ethylene glycol, propylene glycol, ethers such as tetrahydrofuran, ethylene glycol mono butyl ether and the like, and as mentioned above, water and mixtures thereof with water-miscible solvents.

The graft or block copolymer is formed directly in water, solvent or in a water/solvent mixture by copolymerizing the rest of the monomer blend in the presence of the macromonomer which is soluble in water.

Any of the aforementioned azo type catalysts can be used as can other suitable catalysts such as peroxides and hydroperoxides. Typical of such catalysts are di-tertiary butyl peroxide, di-cumyl peroxide, tertiary amyl peroxide, cumene hydroperoxide, di(n-propyl) peroxydicarbonate, peresters such as amyl peroxyacetate and the like. Polymerization is continued usually at the reflux temperature of the reaction mixture until a graft or block copolymer is formed of the desired molecular weight. Water-soluble free radical initiators can be used, suitable in the temperature range of 20 to 98° C., e.g., peroxides such as ammonium persulfate, or redox initiators such as t-butyl hydroperoxide/ascorbic acid. On copolymerizing the monomers with the macromonomer, chain transfer agents other than the cobalt chelates can be used as, e.g., mercaptans, mercaptoethanol, t-dodecylmercaptan, n-dodecylmercaptan. These binder systems are utilized to produce waterborne coatings by blending with other suitable components in accordance with normal paint formulation techniques. The graft copolymers of the present invention are useful as film-forming vehicles in the preparation of waterborne coating compositions such as, for example, clearcoat or basecoat compositions useful in automotive applications. The resultant coating compositions have low volatile organic content, preferably to a maximum of 3.50 pounds/gallon.

The aqueous graft and block copolymers of this invention show remarkable compatibility with polyisocyanate crosslinking agents. Examples of polyisocyanates include biuret; cyclotrimers of hexamethylene diisocyanate; isophorone diisocyanate; 3,5,5'-trimethyl hexamethylene diisocyanate and isomers thereof; 4,4'-dicyclohexylmethane diisocyanate (available from Bayer AG as "Desmodur W"); toluene diisocyanate; 4,4'-diphenylmethane diisocyanate; and tetramethyl xylylene diisocyanate. Further examples include reaction products of polyols (e.g., trimethylol propane) with an excess of a diisocyanate to form isocyanate functional polyurethanes. Optionally, polyisocyanate functional polyester-urethanes or acrylic-urethanes may also be used to advantage. Optionally, one can use a polyisocyanate functional acrylics derived from 2-isocyanato ethyl methacrylate or (benzene, 1-(1-isocyanato-1-methyl ethyl)-4(1-methyl ethenyl)) (commercially available from Cytec as "M-TMI") by polymerization with other unsaturated compounds.

The isocyanates can be modified with hydrophilic groups to ease incorporation into water. Examples of hydrophilic groups include polyethyleneoxide. Preferably, hydrophobic polyisocyanates are used. Surprisingly, the aqueous copolymers of the present invention, when cured with an polyisocyanate showed film-forming properties, hardness, appearance and resistance to chemicals and solvents equal to that of a solvent based 2 package finish system.

Cure promoting catalyst can be used in the coating compositions of this invention, as is typical in the art when isocyanate crosslinking or curing agents are employed. Preferred catalysts are organometallics, suitably dibutyl tin dilaurate, zinc octoate, dibutyl tin diacetate zinc naphthenate, vanadium acetyl acetonate or zirconium acetyl acetonate, in an effective curing amount, typically from about 0.1 to 2% by weight of binder. Such catalysts are optional, for example, elevated temperature and/or time may suffice to cure the composition.

Other film-forming binders, such as acrylics, polyesters, polyurethanes, polyethers, polyamides and others may be present in the final coating composition. In addition, a composition according to the present invention can contain a variety of other optional ingredients, including pigments, pearlescent flakes, fillers, plasticizers, antioxidants, surfactants and flow control agents. To improve weatherability of a finish produced by the present coating composition, an ultraviolet light stabilizer or a combination of ultraviolet light stabilizers can be added in the amount of about 0.1 to 5% by weight, based on the weight of the binder. Such stabilizers include ultraviolet light absorbers, screeners, quenchers, and specific hindered amine light stabilizers. Also, an antioxidant can be added, in the about 0.1 to 5% by weight, based on the weight of the binder. Typical ultraviolet light stabilizers that are useful include benzophenones, triazines, benzoates, hindered amines and mixtures thereof. Specific examples of ultraviolet stabilizers are disclosed in U.S. Pat. No. 4,591,533. The composition can also include conventional formulation additives such as flow control agents, for example, Resiflow S (polybutylacrylate), BYK 320 and 325 (high molecular weight polyacrylates); rheology control agents, such as fumed silica, and the like. When the present composition is used as a clearcoat (topcoat) over a pigmented colorcoat (basecoat) to provide a colorcoat/clearcoat finish, small amounts of pigment can be added to the clear coat to provide special color or aesthetic effects such as tinting. The present composition can be pigmented and used as the colorcoat, monocoat, primer, or primer surfacer. The composition has excellent adhesion to a variety of metallic or non-metallic substrates, such as previously painted substrates, cold rolled steel, phosphatized steel and steel coated with conventional primers by electrodeposition.

The present composition can be used to coat plastic substrates such as polyester reinforced fiberglass, reaction injection-molded urethanes and partially crystalline polyamides. When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake and the like. The pigments can be introduced into the coating composition by first forming a mill base or pigment dispersion with any of the aforementioned polymers used in the coating composition or with another compatible polymer or dispersant by conventional techniques, such as high speed mixing, sand grinding, ball mill, attritor grinding or two roll milling. The mill base is then blended with the other constituents used in the coating composition. The coating composition can be applied by conventional techniques such as spraying, electrostatic spraying, dipping, brushing, flowcoating and the like. The preferred techniques are spraying and electrostatic spraying. The present composition can be used as an ambient cure, especially for refinish, or at elevated temperature. In OEM application, the composition is typically baked at 100 to 150° C. for about 15 to 30 minutes to form a coating about 0.1 to 3.0 mils thick. When the composition is used as a clearcoat, it is applied over the colorcoat which can be dried to a tack-free state and cured or preferably flash dried for a short period before the clearcoat is applied. The colorcoat/clearcoat finish is then baked to provide a dried and cured finish. It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following examples illustrate the invention. All parts and percentages are on a weight basis unless otherwise indicated. All molecular weights disclosed herein are determined by gel permeation chromatography using a polystyrene standard.

EXAMPLES

Example 1

Macromonomer

This example illustrates the use of a Co (II) chelate in the synthesis of following macromonomers. The chelate $BF_2$ bridged Co (II) (1,2-diphenyl-1,2-dioxoiminomethane) ($H_2O$) chelate is as described in example 44B of EP 0199436. Mixture 1 (below) was heated at reflux (±100° C.) in a reaction vessel that was kept under nitrogen. Mixture 2 was added over 4 hours followed immediately by mixture 3 for rinsing. Afterwards, the reaction mixture was held for another 30 minutes at reflux. During the process, the temperature was held at about 100° C. reflux.

| Mixture 1 | |
|---|---|
| Methyl ethyl ketone | 9.5 |
| Co (II) chelate | 0.01 |
| 2-hydroxyethyl methacrylate | 14 |
| Mixture 2 | |
| 2-hydroxyethyl methacrylate | 56 |
| VAZO ® 52 initiator (DuPont) | 0.56 |
| Methyl ethyl ketone | 18.93 |
| Mixture 3 | |
| Methyl ethyl ketone | 1 |
| Test Results: | |
| Solids | 65.6 |
| Viscosity (Gardner-Holdt) | B |
| Acid value | 0.8 |
| Mn | 990 |
| Mw | 1340 |

This macromonomer is completely soluble in water.

Example 2

Macromonomer

This example illustrates the use of Co (III) chelate in the synthesis of the macromonomer. The chelate is bis [1,2-dimethylethane-1,2-dione dioximato (difluoroborato)] (isopropyl) cobalt III hydrate. The procedure and percentage of Example 1 were used with the following changes.

| Mixture 1 | |
|---|---|
| Deionized water | 16.95 |
| Co (III) chelate | 0.05 |
| 2-hydroxyethyl methacrylate | 14 |

-continued

| Mixture 2 | |
|---|---|
| 2-hydroxyethyl methacrylate | 56 |
| Deionized water | 10.45 |
| (4,4'-azobis-)4-cyano pentanecarboxylic acid | 0.3 |
| Dimethylethanolamine | 0.25 |
| Mixture 3 | |
| Deionized water | 2 |
| Test Results: | |
| Solids | 39.5% |
| Viscosity | less than A |
| pH | 6.4 |
| Mn | 940 |
| Mw | 1280 |

This macromonomer is completely soluble in water.

Examples 3 to 6
Graft and Block Copolymer Emulsions

These examples illustrate the invention in which low molecular weight graft copolymer emulsions are prepared directly in a water/solvent blend in which the solvent is stripped-off afterwards. The graft copolymer emulsions are formed in the presence of a macromonomer which is water soluble and basically free of any acid groups. Mixture 1 (below) was heated at reflux in a reaction vessel. Mixture 2 and Mixture 3 were added simultaneously over a 4 hour period following by the addition of Mixture 4 as a rinsing step. The contents were kept 1 hour at reflux followed by addition of Mixture 5 over 20 minutes. Mixture 6 was added as a rinsing step and the reactor contents refluxed for another hour. Next, Mixture 7 was added and the organic volatiles were stripped off.

| Example | 3 | 4 | 5 | 6 |
|---|---|---|---|---|
| Mixture 1 | | | | |
| Deionized water | 10 | 10 | 10 | 10 |
| Macro example 1 | 65 | 65 | 65 | 65 |
| Mixture 2 | | | | |
| Methyl methacrylate | 21.7 | 22.05 | | |
| Butyl methacrylate | | | 21.7 | |
| Ethyl acrylate | | | | 21.7 |
| Methacrylic acid | 2.8 | | 2.8 | 2.8 |
| Acrylic acid | | 2.45 | | |
| Mixture 3 | | | | |
| (4,4'-azobis-(4-cyano pentane carboxylic acid | 0.3 | 0.3 | 0.3 | 0.3 |
| Dimethylethanolamine | 0.25 | 0.25 | 0.25 | 0.25 |
| Deionized water | 9.45 | 9.45 | 9.45 | 9.45 |
| Mixture 4 | | | | |
| Deionized water | 1 | 1 | 1 | 1 |
| Mixture 5 | | | | |
| (4,4'-azobis-4(4-cyano pentane carboxylic acid | 0.03 | 0.03 | 0.03 | 0.03 |
| Dimethylethanol amine | 0.025 | 0.025 | 0.025 | 0.025 |
| Deionized water | 0.945 | 0.945 | 0.945 | 0.945 |
| Mixture 6 | | | | |
| Deionized water | 1 | 1 | 1 | 1 |
| Mixture 7 | | | | |
| Diethanolamine | 3.25 | | | |
| Dimethylethanol amine | | 2.75 | 2.75 | 2.75 |

-continued

| Example | 3 | 4 | 5 | 6 |
|---|---|---|---|---|
| Deionized water | 3.75 | 20.85 | 11.95 | 4.25 |
| Total | 119.5 | 136.1 | 127.2 | 119.5 |
| Strip-off | 19.5 | 19.5 | 19.5 | 19.5 |
| Yield | 100.0 | 116.6 | 107.7 | 100.0 |
| Test Results | | | | |
| Solids (%) | 70.2 | 60.0 | 65.0 | 69.9 |
| Viscosity* (CPS) | 12600 | 7700 | 12000 | 2750 |
| pH | 8.3 | 8.6 | 8.7 | 7.6 |
| Mn | 880 | 1180 | 2700 | 1770 |
| Mw | 2200 | 2600 | 6900 | 3200 |

*Measured with Brookfield at 20 rpm.

Example 7

Block Copolymer Dispersion

In this example an AB block copolymer composition was prepared using the procedure from above with the following mixtures:

| Mixture 1 | |
|---|---|
| Macro example 1 | 65 |
| Methylethylketone | 3.5 |
| Mixture 2 | |
| Butyl methacrylate | 21.7 |
| Methacrylic acid | 2.8 |
| Mixture 3 | |
| VAZO ® 67 initiator (DuPont) | 0.3 |
| Methyl ethyl ketone | 3.7 |
| Mixture 4 | |
| Methyl ethyl ketone | 1 |
| Mixture 5 | |
| VAZO ® 67 | 0.3 |
| Methyl ethyl ketone | 0.97 |
| Mixture 6 | |
| Methylethyl ketone | 1 |
| Mixture 7 | |
| Dimethyl ethanolamine | 2.75 |
| Deionized water | 27.25 |
| Total | 130 |
| Strip off | 30 |
| Yield | 100 |
| Test Results: | |
| Solids | 71.5 |
| Viscosity | 19500 |
| pH | 8 |
| Mn | 1680 |
| Mw | 2700 |

Examples 8 to 14

Using the same procedure from Example 7, a series of AB block copolymers were made using the following mixtures:

| Example | 8 | 9 | 10 | 11 | 12 | 13 | 14 |
|---|---|---|---|---|---|---|---|
| Mixture 1 | | | | | | | |
| Macro example 1 | 85.7 | 85.7 | 85.7 | 85.7 | 85.7 | 85.7 | 85.7 |
| Mixture 2 | | | | | | | |
| n-butyl methacrylate | 34 | 34 | 24 | 34 | 33 | | 33 |
| 2-ethyl hexyl methacrylate | | | | | | 33 | |
| t-butylaminoethyl methacrylate | 2 | 2 | 2 | 2 | | 3 | 2 |
| diethylaminoethyl methacrylate | | | | | 3 | | |
| methacrylic acid | 4 | 4 | 4 | 4 | 4 | 4 | 4 |
| 2-hydroxypropyl methacrylate | | | 10 | | | | |
| Mixture 3 | | | | | | | |
| VAZO ® 64 | 0.3 | 0.3 | 0.3 | 0.3 | 0.3 | 0.3 | 0.3 |
| methylethyl ketone | 3.83 | 3.83 | 3.83 | 3.83 | 3.83 | 3.83 | 3.83 |
| Mixture 4 | | | | | | | |
| methylethyl ketone | 0.5 | 0.5 | 0.5 | 0.5 | 0.5 | 0.5 | 0.5 |
| Mixture 5 | | | | | | | |
| VAZO ® 64 | 0.1 | 0.1 | 0.1 | 0.1 | 0.1 | 0.1 | 0.1 |
| methylethyl ketone | 0.9 | 0.9 | 0.9 | 0.9 | 0.9 | 0.9 | 0.9 |
| Mixture 6 | | | | | | | |
| methylethyl ketone | 2 | 2 | 2 | 2 | 2 | 2 | 2 |
| Mixture 7 | | | | | | | |
| Dimethylethanol amine | 4 | | 4 | | 4 | 4 | 4 |
| trishydroxyamino methane | | | | 5.44 | | | |
| triethanolamine | | 6.69 | | | | | |
| Deionized Water | 96 | 143.3 | 146 | 144.6 | 96 | 146 | 50 |
| Total | 233.3 | 187.3 | 283.3 | 283.3 | 233.3 | 283.3 | 187.3 |
| Strip-off | 33.33 | 33.33 | 33.33 | 33.33 | 33.33 | 33.33 | 33.33 |
| Yield | 200 | 154 | 250 | 250 | 200 | 250 | 154 |
| Test Results: | | | | | | | |
| Solids | 51.5 | 40.12 | 40.7 | 40 | 49.3 | 40.7 | 64.4 |
| Viscosity (cps) | 23250 | 5350 | 6400 | 5600 | 7250 | 12300 | 4150 |
| pH | 8.6 | 8 | 8.7 | 7.9 | 8.6 | 8.8 | 8.8 |
| No. Avg. Mol. Wt. | 1600 | 1600 | 1800 | 1600 | 1500 | 1500 | 2000 |
| Wt. Avg. Mol. Wt. | 3100 | 2900 | 5200 | 2900 | 2800 | 3100 | 4200 |

Comparative Example 1

The procedure for Example 5 was repeated except that the macromonomer comprised 70% by weight of 2-hydroxyethyl methacrylate in methyl ethyl ketone and 50% more of the Co (II) chelate was used to lower the molecular weight. This procedure resulted in a random linear copolymer with MN=8100 and MW=17300. The copolymer emulsion had very high viscosity and needed to be diluted to 31% solids (4300 cps). The emulsion was not compatible with a typical hexamethylenediisocyanate based crosslinking agent.

Comparative Example 2

The procedure of Example 7 was used to prepare a linear random copolymer dispersion with the same molecular weight and composition using the Co (II) chelate as the chain transfer agent. The resulting copolymer dispersion was neutralized with dimethylethanol amine and had a MN=1960 and MW=3400. The dispersion was not stable (settling).

Comparative Example 3

A linear random copolymer with the same overall composition as Example 11 was made. The copolymer had a MN=1140 and MW=3100. The dispersion was not stable (phase separation).

Comparative Macromonomer Example 1

The procedure of macromonomer example 1 was followed using 2-hydroxypropyl methacrylate instead of 2-hydroxyethyl methacrylate. The macromonomer was not water soluble, had an acid value of 0.3, a MN of 550 and a MW of 1200.

Comparative Examples 4 & 5

Examples 7 and 11 were repeated using Comparative Macromonomer 1. The resulting dispersion and emulsion were unstable.

Coating Example

Following the procedure of Example 11 of WO95/32229, a self stabilizing latex was prepared which comprised 75% backbone and 25% macromonomer. The copolymer had a weight average molecular weight of 17000, a hydroxyl value of 96 and an amine value of 15. The latex was then blended with the copolymer dispersion of example 11 above in latex/dispersion ratios of 100/0 (Sample A); 80/20 (Sample B) and 50/50 (Sample C) weight on solids. Desmodur LS2025 polyisocyanate crosslinker (Bayer AG) was then added to each blend in a hydroxyl/ isocyanate molar ratio of 1/1.25. The mixture was then diluted to 21 seconds Ford cup spray viscosity with deionized water, applied to a steel panel and cured for 45 minutes at 45 ° C. After cure, the hardness, gloss, transparency and waterspot resistance was measured. Results are reported below.

| Sample | Hardness | | Gloss (60) | Transparency | Waterspot |
| | Persoz (second) | Fischer (knoop) | | | |
| --- | --- | --- | --- | --- | --- |
| A | 160 | 4.5 | 70 | Fail | Fail |
| B | 180 | 7.0 | 73 | Fail | Pass |
| C | 185 | 6.0 | 95 | Pass | Pass |

What is claimed is:

1. A water soluble copolymer comprising:
   (a) 20 to 98% by weight of a macromonomer soluble in water with a hydroxy value of at least 300, a weight average molecular weight below 6000, containing less than 10% by weight of an acid functional monomer and having a terminal unsaturated double bond; and
   (b) 2 to 80% of polymerized monomers selected from vinyl monomers, acrylate monomers, methacrylate monomers and mixtures thereof;
   wherein said copolymer is selected from graft copolymers and block copolymers and has a weight average molecular weight below 20,000, a hydroxy value more than 200 and acid value below 50.

2. The copolymer of claim 1 wherein the macromonomer comprises methacrylate monomer units which have been reacted in the presence of a cobalt chelate chain transfer agent.

3. The copolymer of claim 1 wherein the macromonomer comprises at least 50% by weight of 2-hydroxyethyl methacrylate.

4. The copolymer of claim 1 wherein the copolymer comprises 0.5 to 20% by weight of amino functional monomers.

5. The copolymer of claim 4 wherein the amino functional monomer is t-butylaminoethyl methacrylate.

6. The copolymer of claim 1 wherein the copoloymer comprises less than 7% by weight of an acid functional monomer and wherein at least 10% of the acid groups have been neutralized with an amine.

7. A coating water soluble composition comprising:
   (a) a vehicle;
   (b) 10 to 95% of a water soluble copolymer binder comprising:
      (1) 20 to 98% by weight of a macromonomer soluble in water with a hydroxy value of at least 300, a weight average molecular weight below 6000, containing less than 10% by weight of an acid functional monomer and having a terminal unsaturated double bond; and
      (2) 2 to 80% of polymerized monomers selected from vinyl monomers, acrylate monomers, methacrylate monomers and mixtures thereof;
   wherein said copolymer binder is selected from graft copolymers and block copolymers and has a weight average molecular weight below 20,000, a hydroxy value more than 200 and acid value below 50;
   (c) 5 to 60% of a crosslinking agent, based on the weight of the copolymer binder; and
   (d) 0 to 85% of auxiliary binders, based on the weight of the copolymer binder.

8. The composition of claim 7 wherein the crosslinker comprises a polyisocyanate derived from diisocyanates selected from aliphatic, cycloaliphatic and aromatic diisocyanates.

9. The composition of claim 8 wherein the polyisocyanate is derived from diisocyanates selected from hexamethylene diisocyanate and isophorone diisocyanate.

* * * * *